(12) United States Patent
Weber

(10) Patent No.: US 8,668,062 B2
(45) Date of Patent: Mar. 11, 2014

(54) DAMPER FOR FURNITURE

(76) Inventor: Konrad Weber, Ebsdorfergrund (DE)

( * ) Notice: Subject to any disclaimer, the term of this patent is extended or adjusted under 35 U.S.C. 154(b) by 24 days.

(21) Appl. No.: 13/266,851

(22) PCT Filed: Apr. 16, 2010

(86) PCT No.: PCT/EP2010/055034
§ 371 (c)(1),
(2), (4) Date: Dec. 28, 2011

(87) PCT Pub. No.: WO2010/124945
PCT Pub. Date: Nov. 4, 2010

(65) Prior Publication Data
US 2012/0085607 A1    Apr. 12, 2012

(30) Foreign Application Priority Data
Apr. 28, 2009   (DE) ............. 20 2009 004 752 U

(51) Int. Cl.
*F16F 9/34* (2006.01)
(52) U.S. Cl.
USPC ............. 188/282.1; 188/282.6; 188/317; 188/322.15
(58) Field of Classification Search
USPC ........ 188/282.1, 281, 282.6, 316, 317, 319.1, 188/320, 322.15; 267/64.11, 64.25
See application file for complete search history.

(56) References Cited

U.S. PATENT DOCUMENTS

| 4,310,148 | A | | 1/1982 | Freitag |
| 4,438,833 | A | | 3/1984 | Schafer |
| 4,467,899 | A | * | 8/1984 | Molders et al. ............... 188/320 |
| 5,460,251 | A | * | 10/1995 | Jeffries ...................... 188/282.1 |
| 5,935,424 | A | * | 8/1999 | Dyer et al. ...................... 210/85 |
| 5,964,454 | A | * | 10/1999 | Volpel .......................... 267/124 |
| 2002/0162714 | A1 | | 11/2002 | Ma |

FOREIGN PATENT DOCUMENTS

| DE | 195 32 996 | 3/1996 |
| WO | 2007/099100 | 7/2007 |

* cited by examiner

*Primary Examiner* — Pamela Rodriguez
(74) *Attorney, Agent, or Firm* — Barnes & Thornburg LLP

(57) ABSTRACT

The invention relates to a damper (1, 1') for furniture, especially hinges, comprising a housing (2, 2') in which a piston (8, 8') is connected to a piston rod (3, 3') and can be displaced. A fluid flows through at least one flow channel (11, 11') on or in the piston (8, 8') during a movement of the piston (8, 8') inside the housing (2, 2'), the movement of the piston (8, 8') resulting in a different damping power in different directions. The cross-section of the flow channel can be modified in some sections on at least one groove (20, 20') by moving a plate (12, 12') relative to the piston (8, 8'). On the at least one groove (20, 20'), a substantially funnel-shaped outlet (22, 22') and/or the groove (20') have a section which is arranged at an angle to the radial direction to avoid cavitation.

6 Claims, 5 Drawing Sheets

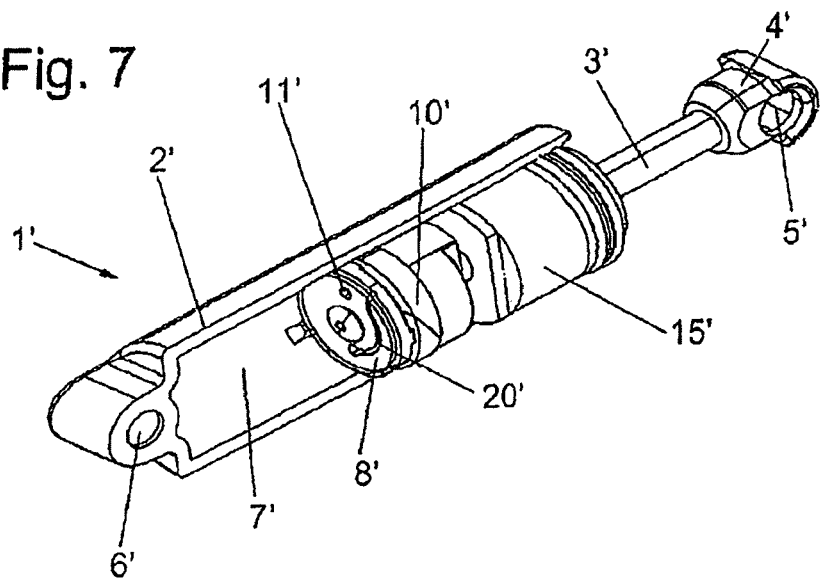
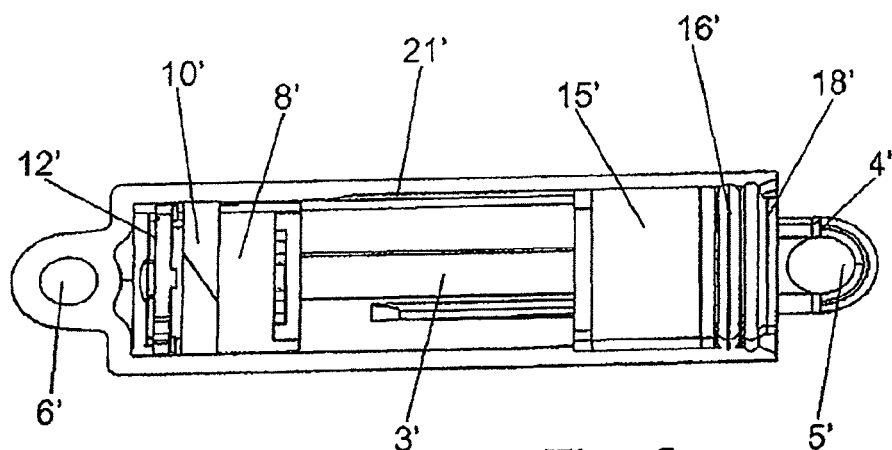

DAMPER FOR FURNITURE

CROSS-REFERENCE TO RELATED APPLICATION

This application is a national stage of International Application PCT/EP2010/055034, filed Apr. 16, 2010, and claims benefit of and priority to German Patent Application No. 20 2009 004 752.0, filed Apr. 28, 2009, the content of which Applications are incorporated by reference herein.

BACKGROUND AND SUMMARY

The present invention relates to a damper for furniture, especially for hinges, comprising a housing in which a piston connected to a piston rod is received so that it can be displaced, where a fluid flows through a flow channel on or in the piston during a movement of the piston inside the housing and a different damping power is obtained during movement of the piston in different directions, where the cross-section of the flow channel can be modified in some sections on at least one groove in which a plate can be moved relative to the piston.

Known from WO 2007/099100 is a damper for furniture in which a piston is displaceable in a cylindrical housing. The housing is filled with a fluid so that during a movement of the piston, damping of a movement takes place, where the damping forces are different depending on the direction of movement of the piston. For this purpose a plate which is movable relative to the piston is provided, by means of which the cross-section of a flow channel can be modified on a groove.

Such a damper has proved successful per se but the flow velocity of the fluid in the flow channel is very high. Specifically during rapid movements of a furniture part, high peak loads can act on the damper. As a result, cavitation can occur in the damper as a result of appreciable pressure differences.

It is therefore the object of the present invention to provide a damper for furniture in which high peak loads can be accommodated without the risk of cavitation.

This object is achieved with a damper having the features of claim 1.

According to the invention a substantially funnel-shaped outlet is formed on the at least one groove and/or the groove has a section disposed at an angle in the radial direction to avoid cavitation. Due to the funnel-shaped outlet a funnel-shaped transition can be provided in the area of the transition between the groove and a flow channel in the axial direction so that the flow velocity is no longer abruptly reduced but is gradually reduced in this transition zone due to expansion of the cross-section. This funnel-shaped transition has the effect that the fluid no longer flows abruptly but with a gentle transition into the flow channel in the axial direction of the piston. This improves the velocity and pressure relationships to avoid cavitation. In addition, it is possible to provide the groove with a section disposed at an angle to the radial direction. As a result, the groove can be lengthened compared with its purely radial extension so that the throttle effect of the groove is distributed over a longer distance and the groove can thus be configured to be larger in cross-section. This measure also reduces the tendency to cavitation since somewhat lower flow velocities are achieved as a result of the larger cross-section of the groove.

In a preferred embodiment of the invention, the groove has a bent section. In this case, the groove can be configured to be wavy or spiral-shaped. Due to this measure, the groove can be lengthened compared with its purely radial extension so that the throttle effect of the groove is distributed over a longer distance and the groove can thus be configured to be larger in cross-section. The groove can have a length of at least 0.5 to 15 mm in this case, which is relatively long compared with the usual diameter of a piston.

In a further embodiment the funnel-shaped outlet has rounded transitions. As a result, the funnel-shaped outlet is configured to be funnel-shaped so that a particularly gentle transition is made from the throttle gap of the groove. The funnel-shaped outlet is preferably disposed adjacent to an axial flow channel of the piston since the cavitation occurs particularly at the transition between the throttle gap and the axial flow channel.

The damper can be configured both as a pressure and as a tension damper. However it is pressure dampers which can be loaded as a result of their design.

The invention is explained in detail hereinafter by two exemplary embodiments with reference to the appended drawings.

BRIEF DESCRIPTION OF THE DRAWINGS

FIG. 7 shows a perspective view of a second exemplary embodiment of a damper according to the invention;

FIGS. 8 and 9 show two views of the damper from FIG. 7 with cutaway housing.

DETAILED DESCRIPTION

Figure 1:
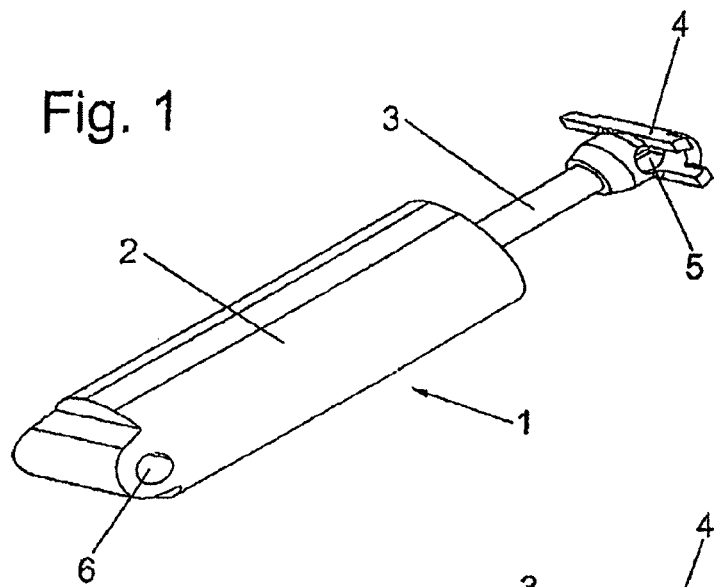
FIG. 1 shows a perspective view of a damper according to the invention.

A damper 1, especially for furniture, comprises a substantially cylindrical housing 2, from which a piston rod 3 projects. A connecting element 4 having a through opening 5 disposed perpendicular to the axial direction is formed on the piston rod 3 at one end, to which connecting element a bolt, for example, of a hinge can be coupled. A through opening 6 likewise extending perpendicular to the longitudinal direction is formed on the housing 2 on the opposite side for connection to the hinge.

Figure 2:
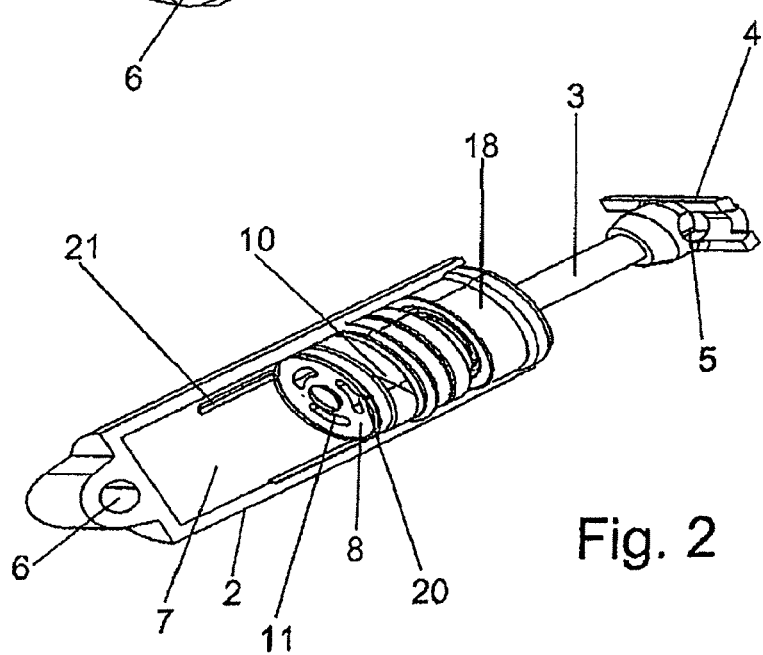
FIG. 2 shows a view of the damper from FIG. 1 with cutaway housing.
Figure 3:
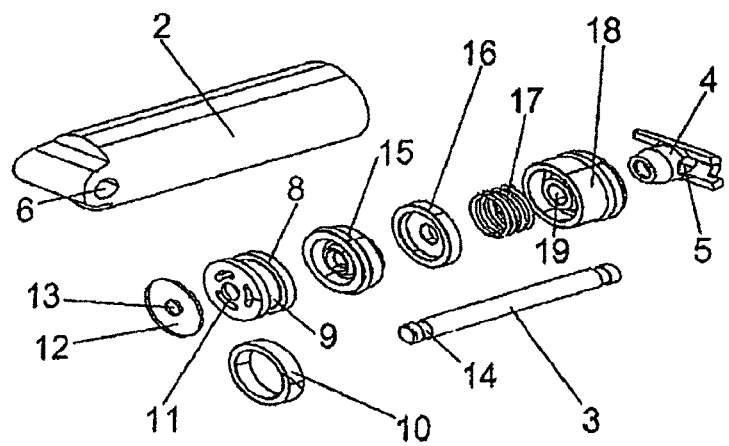
FIG. 3 shows an exploded view of the damper from FIG. 1.

As shown in FIGS. 2 and 3, a piston 8 which is displaceable in the axial direction is disposed in the interior 7 of the housing 2. The piston 8 has an annular groove 9 for a sealing ring 10, which guides the piston 8 along on an inner wall of the housing 2 and seals it. A plurality of through openings 11 extending in the axial direction having an elongate bent cross-section, through which a fluid can flow, are formed in the piston 8. A radial channel 20 is formed on at least one of these through openings 11. The piston 8 is closed at the end by a plate 12 which covers the through openings 11 when the plate 12 rests on the piston 8. This is the case in the exemplary embodiment shown in which the piston 8 is moved into the cylinder, where the damper is configured as a pressure damper. It is naturally conversely also possible to configure the damper as a tension damper.

The plate 12 is formed from an elastic material and has a central opening 13. The plate 12 is fixed on the piston 8 at the opening 13. During a movement of the piston 8 the plate 12 can as desired be bent away from the piston 8 or pressed onto this so that depending on the position of the plate 12 the through openings 11 are completely or only partially closed. If the through openings 11 are closed by the plate 12, the fluid merely flows through the radial groove 20. Instead of an elastic configuration, the plate 12 can also be displaceable on the piston 8. The piston 8 is fixed at the end of the piston rod 3 on a groove 14. The plate 12 is screwed with a screw on the piston face or the plate 12 is stamped with the piston face. The crucial thing is that the movable plate 12 is pressed onto the piston 8 for damping and therefore pressed onto the groove for the throttle effect of the fluid.

In order to be able to be able to make volume compensation during a movement of the piston 8, on the open side of the housing 2 on a cover 18, there is a compensating element comprising a sealing disk 15 which is disposed on a ring 16, which abuts against one side of a spring 17. The opposite end of the spring 17 is supported on an annular receptacle of the cover 18, by which means an opening 19 is formed for passage of the piston rod 3.

Figure 4:
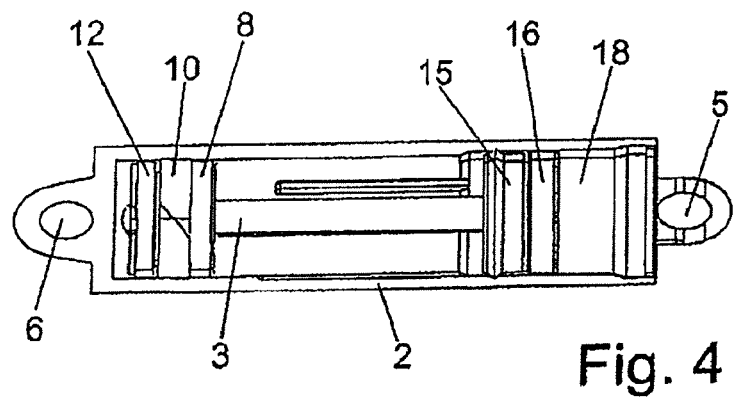
FIG. 4 shows a side view of the damper from FIG. 1 in section.

FIG. 4 shows an end-side position of the piston 8 in the housing 2. The piston rod 3 is inserted into the housing 2 of the damper and can now be withdrawn, whereby the piston 8 moves to the right and the fluid flows through the through openings 11. Only a slight damping force is produced in this direction since the plate 12 bends elastically or is slightly displaced so that the flow cross-section on or in the piston 8 remains relatively large for the fluid. During a movement in the opposite direction however, the plate 12 is pressed onto the through openings 11 so that the fluid can now only flow through the radial groove 20 into one of the through openings 11.

Figure 5:
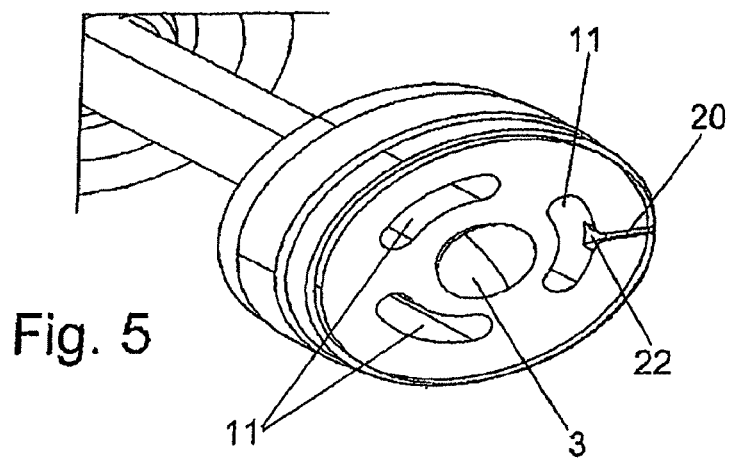
FIGS. 5 and 6 show two enlarged views of the piston of the damper from FIG. 1.
Figure 6:
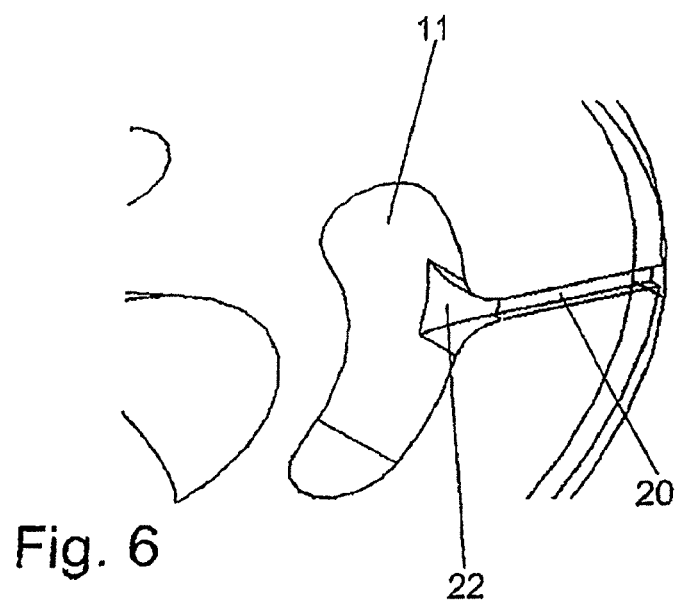
Figure 9:
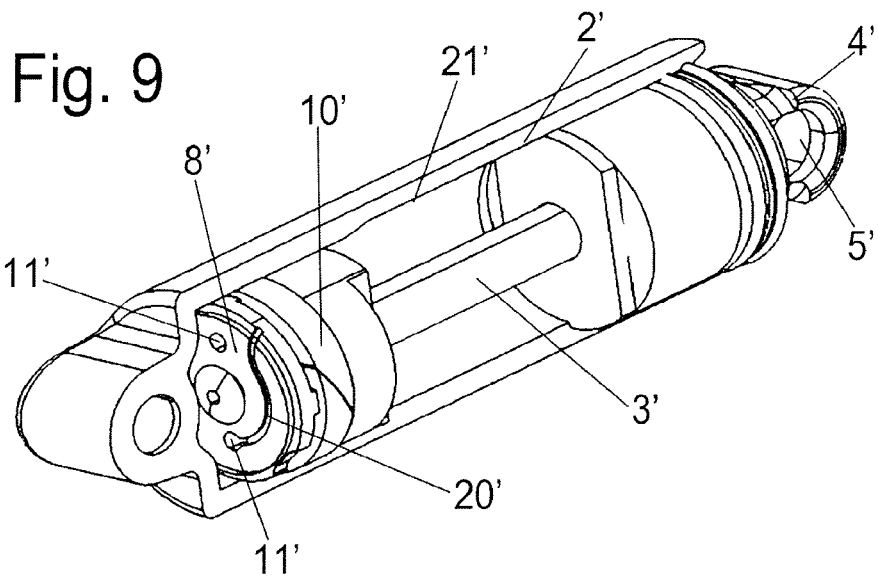

FIGS. 5 and 6 show the outer face of the piston 8 in enlarged view, where the through openings 11 and the radial groove 20 can be seen. At the transition to the through opening 11, the radial groove 20 is provided with a funnel-shaped outlet 22 which is configured as rounded towards the through opening 11 and therefore extends in a trumpet shape. The radius of curvature in the area of the transition between the groove 20 and the axial through openings 11 can lie in the range between 0.3 to 2 mm.

FIGS. 7 to 10 show a second embodiment of a damper 1' according to the invention, which comprises a cylindrical housing 2' in which a piston rod 3' with a piston 8' is displaceably mounted. The piston rod 3' projects from the housing 2' with an end section on which a connecting element 4' with a through opening 5' is formed. On the opposite side an opening 6' for connection to another component is also provided on the housing 2'.

As in the preceding exemplary embodiment, the damper 1' comprises a fluid-filled interior 7' which is used for damping. On its outer circumference the piston 8' has a sealing ring 10' and has two circular through openings 11', where a groove 20' extends from one through opening 11' on a face of the piston 8'.

In the housing 2' a cover 18' is provided on the open side, on which a compensating element comprising a sealing element 16' is provided for volume compensation, a compressible element, for example, a spring-loaded compensating piston or an elastically compressible element being provided on said compensating element. It is also possible to provide other elastic elements.

One or more grooves 21' running in the axial direction are formed on an inner wall of the housing 2', which enable a connection to be made in this area between the two chambers separated by the piston 8'. However, the grooves 21' end before the end section of the piston 8' so that when inserting the piston 8, a corresponding pressure can be built up first in this end section of the piston 8, which can then only be reduced via the throttle gap 20, 20'.

Figure 10:
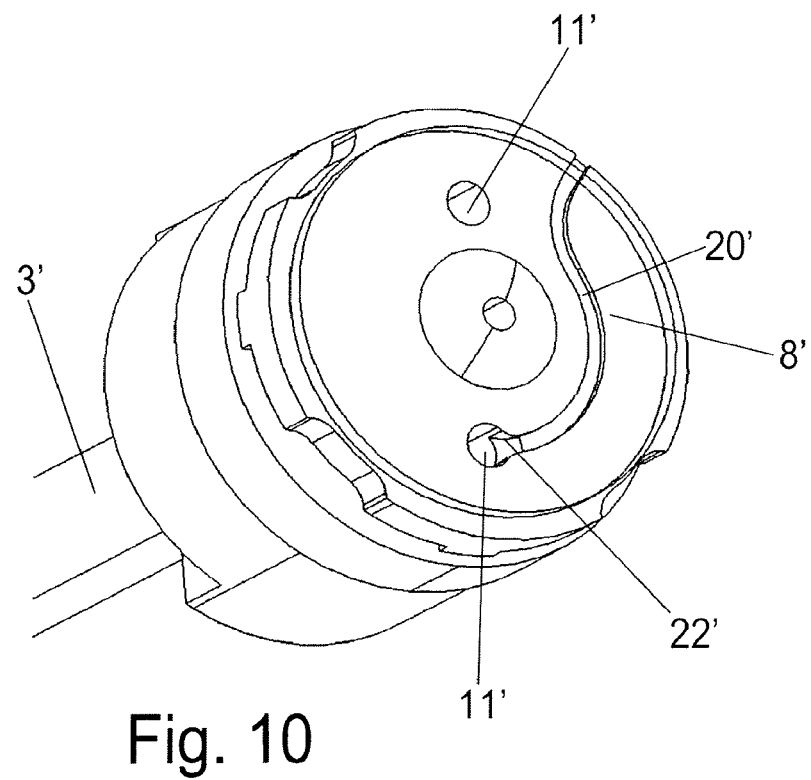
FIG. 10 shows a perspective detailed view of the piston of the damper from FIG. 7.

As shown in FIG. 10, a funnel-shaped transition 22' is located between the through opening 11' in the axial direction and the groove 20' disposed perpendicular thereto on the face of the piston 8', which, as in the preceding exemplary embodiment, is configured to be rounded in a trumpet shape. In addition, the groove 20' not only extends in the radial direction but is significantly longer and runs in a wavy shape on one face of the piston 8'. The groove 20' is thereby guided around the piston centre so that the length of the groove 20' can be between 5 mm and 15 mm, which is a significant lengthening compared with the previously known flow channels. The groove 20' can thus be larger in cross-section since the throttle function is not only restricted to a short section but due to the far longer configuration, can be distributed over the entire length of the groove 20'. Other forms of the groove 20' are also possible, in particular the groove 20' can be guided in the manner of a thread around the piston centre or have different curvatures and geometries.

Although the present disclosure has been described and illustrated in detail, it is to be clearly understood that this is done by way of illustration and example only and is not to be taken by way of limitation. The scope of the present disclosure is to be limited only by the terms of the appended claims.

I claim:

1. A damper for furniture, the damper comprising:
a housing;
a piston located in the housing and a piston rod connected to the piston, the piston configured to be displaceable inside the housing;
at least one flow channel located either in or on the piston, the at least one flow channel configured to accommodate a fluid flow;
a plate inside the housing configured to be moved relative to the piston;
at least one groove formed on the at least one flow channel, and a different damping power is obtained during movement of the piston in different directions, wherein a cross-section of the at least one flow channel is configured to be modified, at least in sections, on the at least one groove;
a substantially funnel-shaped outlet is formed on the at least one groove at a transition between the substantially funnel-shaped outlet and the at least one groove, the substantially funnel-shaped outlet extending in a trumpet shape to avoid cavitation during the fluid flow; and
wherein the transition is rounded and has a radius of curvature between 0.3 and 2 mm.

2. The damper according to claim 1, wherein the at least one groove has a bent section.

3. The damper according to claim 1, wherein the at least one groove is configured to be wavy or spiral-shaped.

4. The damper according to claim 1, wherein the at least one groove has a length of at least 5 mm.

5. The damper according to claim 1, wherein the funnel-shaped outlet is disposed adjacent to an axial flow channel on the piston.

6. The damper according to claim 1, wherein the groove includes a section disposed at an angle to a radial direction to avoid cavitation during the fluid flow.

* * * * *